(12) United States Patent
Prusak et al.

(10) Patent No.: US 12,286,193 B2
(45) Date of Patent: Apr. 29, 2025

(54) SNOWMOBILE

(71) Applicant: Polaris Industries Inc., Medina, MN (US)

(72) Inventors: Matthew J. Prusak, Salol, MN (US); Michael A. Hedlund, Roseau, MN (US); Dean A. Wensloff, Roseau, MN (US); Jeffrey A. Eaton, Roseau, MN (US); Joseph P. Wood, Forest Lake, MN (US)

(73) Assignee: POLARIS INDUSTRIES INC., Medina, MN (US)

( * ) Notice: Subject to any disclaimer, the term of this patent is extended or adjusted under 35 U.S.C. 154(b) by 319 days.

(21) Appl. No.: 17/878,526

(22) Filed: Aug. 1, 2022

(65) Prior Publication Data
US 2023/0049333 A1     Feb. 16, 2023

Related U.S. Application Data

(60) Provisional application No. 63/231,515, filed on Aug. 10, 2021.

(51) Int. Cl.
    *B62M 27/02*       (2006.01)
(52) U.S. Cl.
    CPC ....... *B62M 27/02* (2013.01); *B62M 2027/025* (2013.01); *B62M 2027/027* (2013.01)

(58) Field of Classification Search
CPC ............ B62M 27/02; B62M 2027/025; B62M 2027/027
See application file for complete search history.

(56) References Cited

U.S. PATENT DOCUMENTS

| | | | |
|---|---|---|---|
| 6,431,561 B1 * | 8/2002 | Hedlund | B62M 27/02 280/22.1 |
| 6,692,009 B2 | 2/2004 | Lemieux | |
| 6,860,352 B2 * | 3/2005 | Mallette | B62M 27/02 180/182 |
| 6,955,237 B1 * | 10/2005 | Przekwas | B62M 27/02 280/601 |
| 8,657,054 B2 | 2/2014 | Mallette | |

* cited by examiner

*Primary Examiner* — Bryan A Evans
(74) *Attorney, Agent, or Firm* — Merchant & Gould P.C.

(57) ABSTRACT

A vehicle is provided and includes a frame including a tunnel and a front portion, an endless track at least partially positioned within the tunnel, a ski supporting the front portion of the frame, a spindle coupled to the ski, and a front suspension coupled to the spindle. The ski defines a central plane extending vertically and longitudinally, the central plane defining an inboard lateral side and an outboard lateral side, the ski having a bottom surface and a keel extending therefrom on the outboard lateral side. The spindle is coupled to the ski at a first position on the outboard lateral side of the ski. The front suspension is coupled to the spindle at a second position outboard from the central plane of the ski.

20 Claims, 12 Drawing Sheets

SNOWMOBILE

CROSS-REFERENCE TO RELATED APPLICATION

The present application claims the benefit of U.S. Provisional Patent Application No. 63/231,515, filed Aug. 10, 2021, the entire disclosure of which is incorporated herein by reference.

FIELD OF THE DISCLOSURE

The present disclosure relates to snowmobile suspension and ski assemblies and, more particularly, to front suspension and ski assemblies configured to provide increased stability and traction.

BACKGROUND OF THE DISCLOSURE

Skis are one of the ground contact members for snowmobiles and other snow vehicles. The skis support the vehicle on the ground and allow for the steering of the vehicle. In some areas, the width of the snowmobiles are limited by regulation, which can affect the stability of a vehicle, especially with respect to cornering.

Furthermore, by limiting the width of snowmobiles, as operators traverse previously-made tracks, the tracks may harden over time due to compaction and through freezing temperatures. These tracks or ruts can result inexcessive steering feedback to the operator when the skis are positioned in the tracks or ruts.

Furthermore, the geometry of ski bottom may result in the buildup of snow and ice under the skis which will further result in reduced steering performance of the vehicle.

As such, there is a need for a snowmobile which complies with width regulations while improving steering capabilities.

SUMMARY OF THE DISCLOSURE

In one aspect, a vehicle includes a frame including a tunnel and a front portion, an endless track at least partially positioned within the tunnel, a ski supporting the front portion of the frame, a spindle coupled to the ski, and a front suspension coupled to the spindle. The ski defines a central plane extending vertically and longitudinally, the central plane defining an inboard lateral side and an outboard lateral side. The spindle is coupled to the ski at a first position on the outboard lateral side. The ski has a bottom surface and a keel extending therefrom on the outboard lateral side. The front suspension is coupled to the spindle at a second position outboard from the central plane of the ski.

In another aspect, the front suspension is coupled to the spindle at a third position located outboard from the central plane of the ski.

In another aspect, an axis extends through the second position and the third position is defined as the king pin axis, and the king pin axis is vertically aligned with the keel.

In another aspect, the ski includes a runner vertically aligned with the king pin axis.

In another aspect, the king pin axis is parallel to central plane of the ski.

In another aspect, the first position at which the spindle is coupled to the ski is positioned along the king pin axis.

In another aspect, the first position and the second position at which the front suspension is coupled to the spindle is at least 22 inches from a longitudinally-extending centerline of the vehicle.

In another aspect, a longitudinally-extending centerline of the keel is positioned at least 22 inches from a longitudinally-extending centerline of the vehicle.

In another aspect, the vehicle includes a steering assembly operably coupled to the spindle at a fourth coupling position vertically above the ski and laterally outboard from the central plane of the ski.

In another aspect, the keel is positioned on an outboard edge of the ski such that an outermost edge of the keel is vertically aligned with the outboard edge of the ski.

In another aspect, the spindle is cantilevered.

In one aspect, a vehicle includes a frame including a tunnel and a front portion, an endless track at least partially positioned within the tunnel, a ski supporting a front portion of the frame, the ski defining a central plane extending vertically and longitudinally, the central plane defining an inboard lateral side and an outboard lateral side, a spindle coupled to the ski at a first position on the outboard lateral side, and a front suspension including a first control arm and a second control arm, the first and second control arms being coupled to the spindle at positions vertically above the ski and laterally outboard from the central plane of the ski.

In another aspect, the first and second control arms are coupled to the spindle at least 22 inches from a longitudinally-extending center of the vehicle.

In another aspect, the ski includes a keel and a runner positioned on the outboard lateral side of the ski.

In another aspect, the keel extends from a bottom surface of the ski at an outboard edge of the ski.

In another aspect, the keel extends from the ski at a position that is linearly aligned with the positions at which the first and second control arms are coupled to the spindle.

In another aspect, the vehicle further includes a steering assembly operably coupled to the spindle at a fourth coupling position vertically above the ski and laterally outboard from the central plane of the ski.

In another aspect, a vertical axis extends through the fourth coupling position and is generally parallel to the king pin axis.

In one aspect, a ski assembly for a snow vehicle includes a ski operable to support a front portion of a frame, the ski defining a central plane extending vertically, the central plane defining an inboard lateral side and an outboard lateral side, the ski having a bottom surface and a keel extending therefrom on the outboard lateral side and a spindle operable to be coupled to the ski at a first position on the outboard lateral side, the spindle including a first suspension mounting position and a second suspension mounting position, the first and second suspension mounting positions being positioned outboard relative to the central plane of the ski when coupled to the ski.

In another aspect, a king pin axis extending through the first and second positions is generally parallel to the central plane.

DETAILED DESCRIPTION OF THE DRAWINGS

Figure 1:
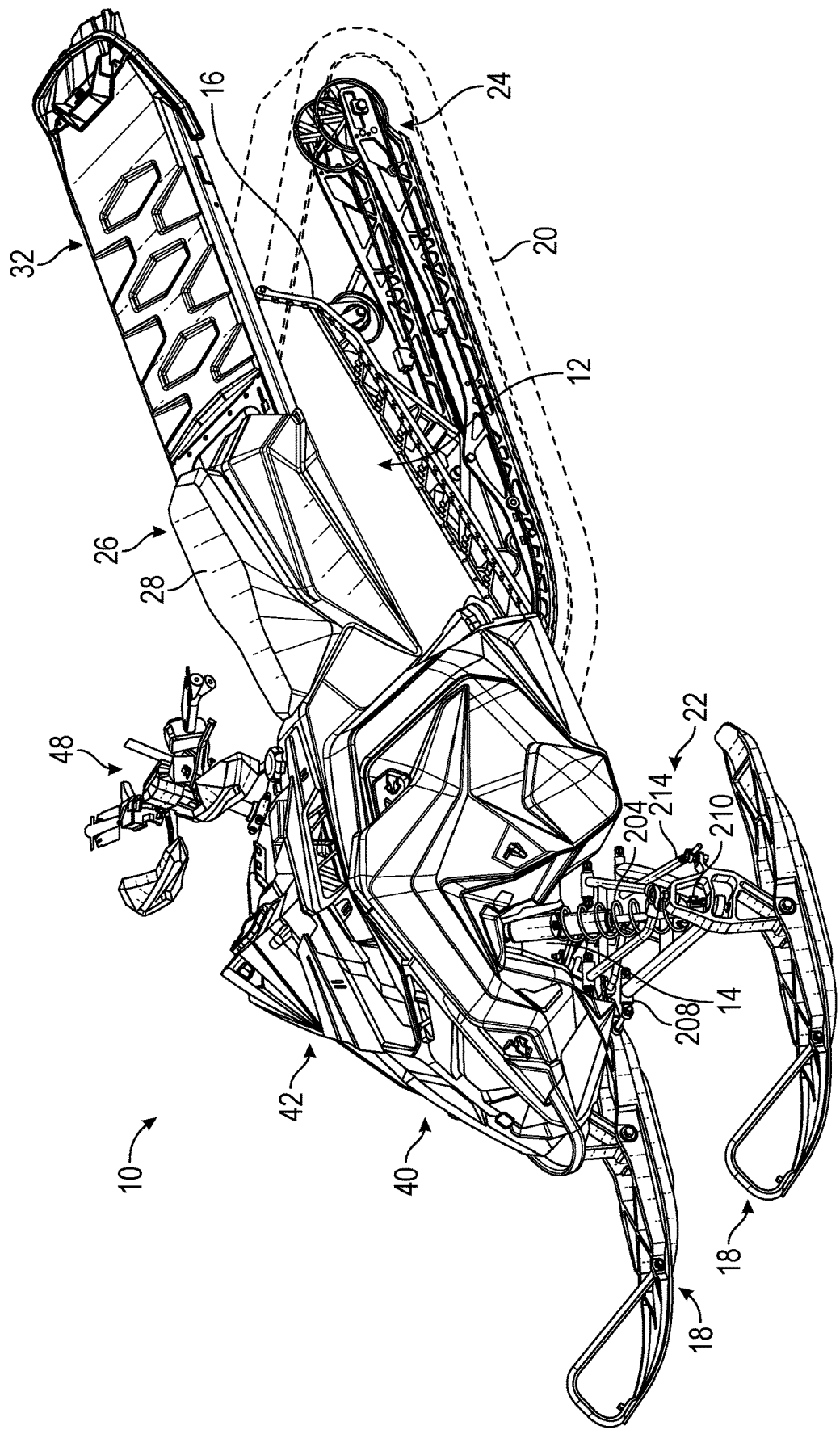
FIG. 1 is a perspective view of a snowmobile of the present application.

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. For example, while the following description refers primarily to a snowmobile, it should be understood that the principles of the invention apply equally to other snow vehicles. While the present invention primarily involves a snowmobile, it should be understood, however, that the invention may have application to other types of vehicles, such as motorcycles, ATVs, utility vehicles, scooters, and mopeds. It will be understood that no limitation of the scope of the invention is thereby intended. The invention includes any alterations and further modifications in the illustrative devices and described methods and further applications of the principles of the invention which would normally occur to one skilled in the art to which the invention relates.

Referring to FIG. 1, an illustrative embodiment of a snowmobile 10 includes a chassis or frame 12 including a front frame portion 14 and a rear frame portion 16. The front frame portion 14 is supported by front ground-engaging members, illustratively ski assemblies 18, and rear frame portion 16 is supported by a rear ground-engaging member, illustratively an endless track 20. The ski assemblies 18 are operably coupled to a front suspension assembly 22, and the endless track 20 cooperates with a rear suspension assembly 24. The snowmobile 10 also includes a seat assembly 26 including a driver's seat 28 and an optional passenger seat (not shown). A rear rack assembly 32 is positioned rearwardly of the seat assembly 26 and is coupled to the rear frame portion 16.

A powertrain unit 40 is covered by an outer body 42 and provides power to the endless track 20 to move the snowmobile 10. The powertrain unit 40 is supported by the front frame portion 14 and includes an engine (not shown) and a transmission (not shown). The snowmobile 10 also comprises a steering assembly 48 operably coupled to the ski assembly 18.

Figure 2:
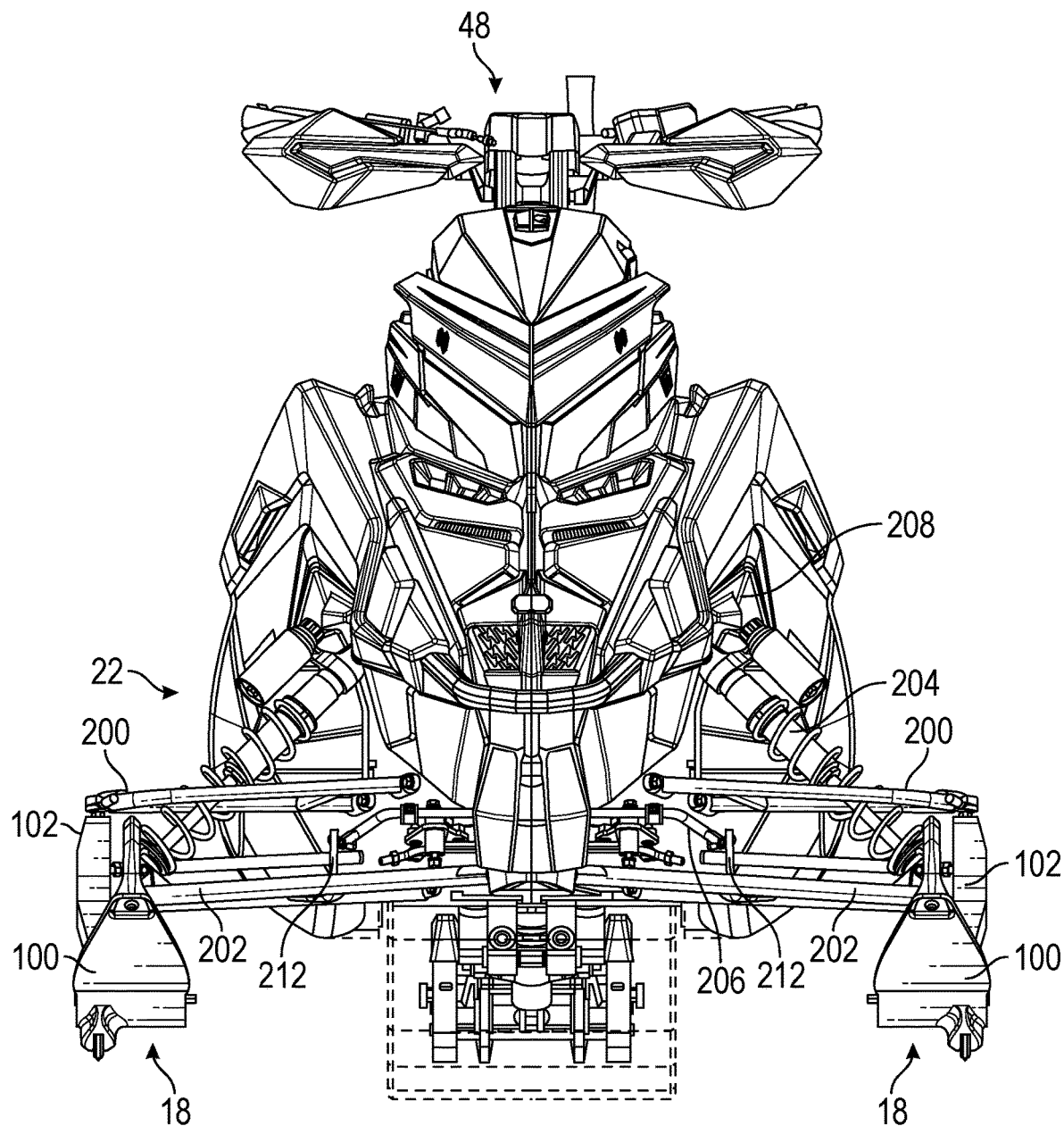
FIG. 2 is a front view of the snowmobile of FIG. 1 and includes ski assemblies, a front suspension, and a steering assembly.

With reference to FIG. 2, the front end of the snowmobile 10 is illustrated. The front end includes the front frame portion 14, the ski assembly 18, the front suspension assembly 22, and the steering assembly 48. It is noted that the front end of the snowmobile may also support the powertrain unit 40, including the engine, transmission, and so forth. The ski assembly 18 generally includes a ski 100 and a spindle 102 coupled to the ski 100. As illustrated, the snowmobile 10 includes two ski assemblies 18, one for the left side of the vehicle and one for the right side of the vehicle. The ski assembly 18 is operably coupled to the front suspension assembly 22 and the steering assembly 48.

Figure 8:
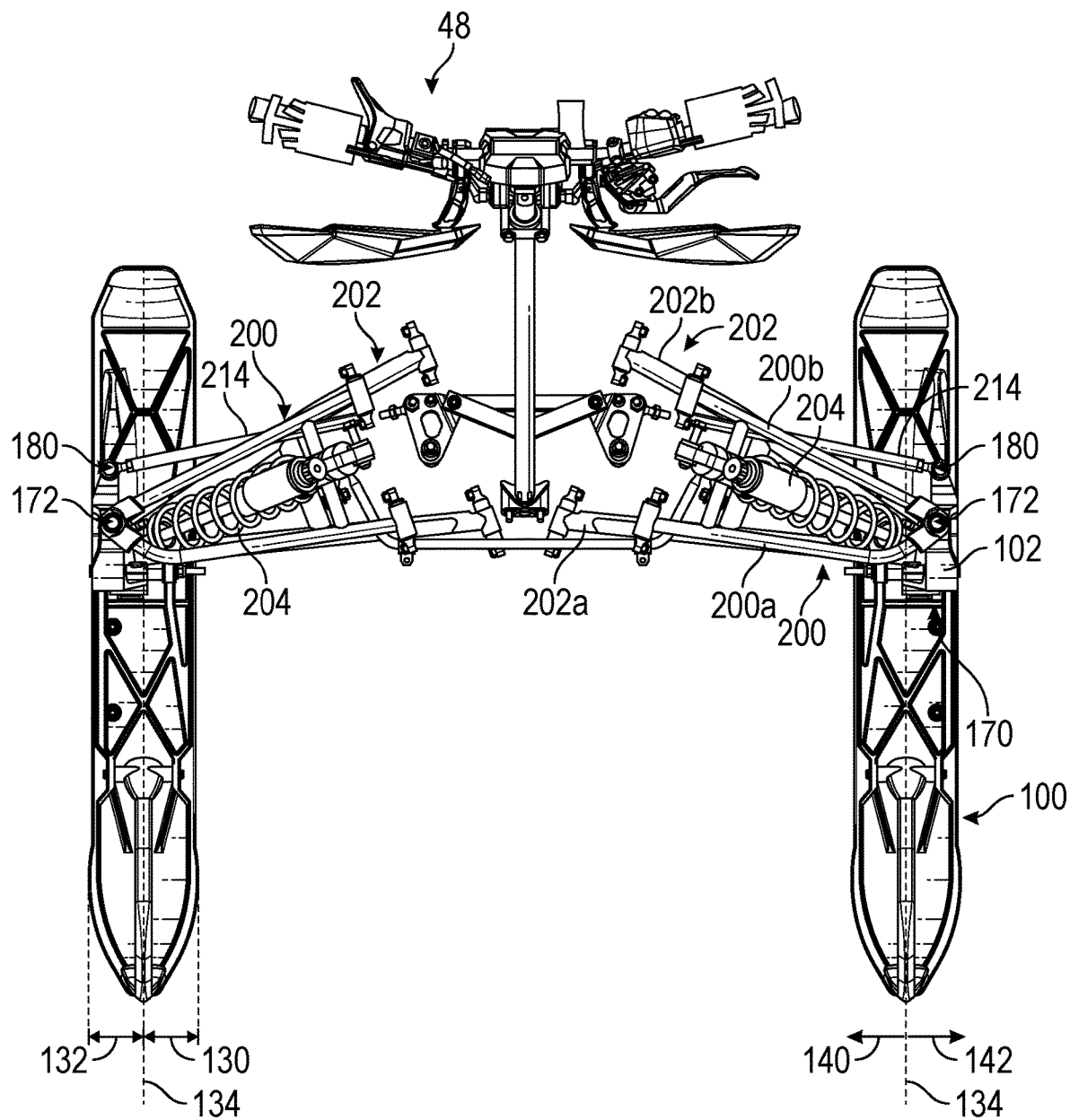
FIG. 8 is a top view of the ski assembly, the front suspension, and the steering assembly of FIG. 2.
Figure 9:
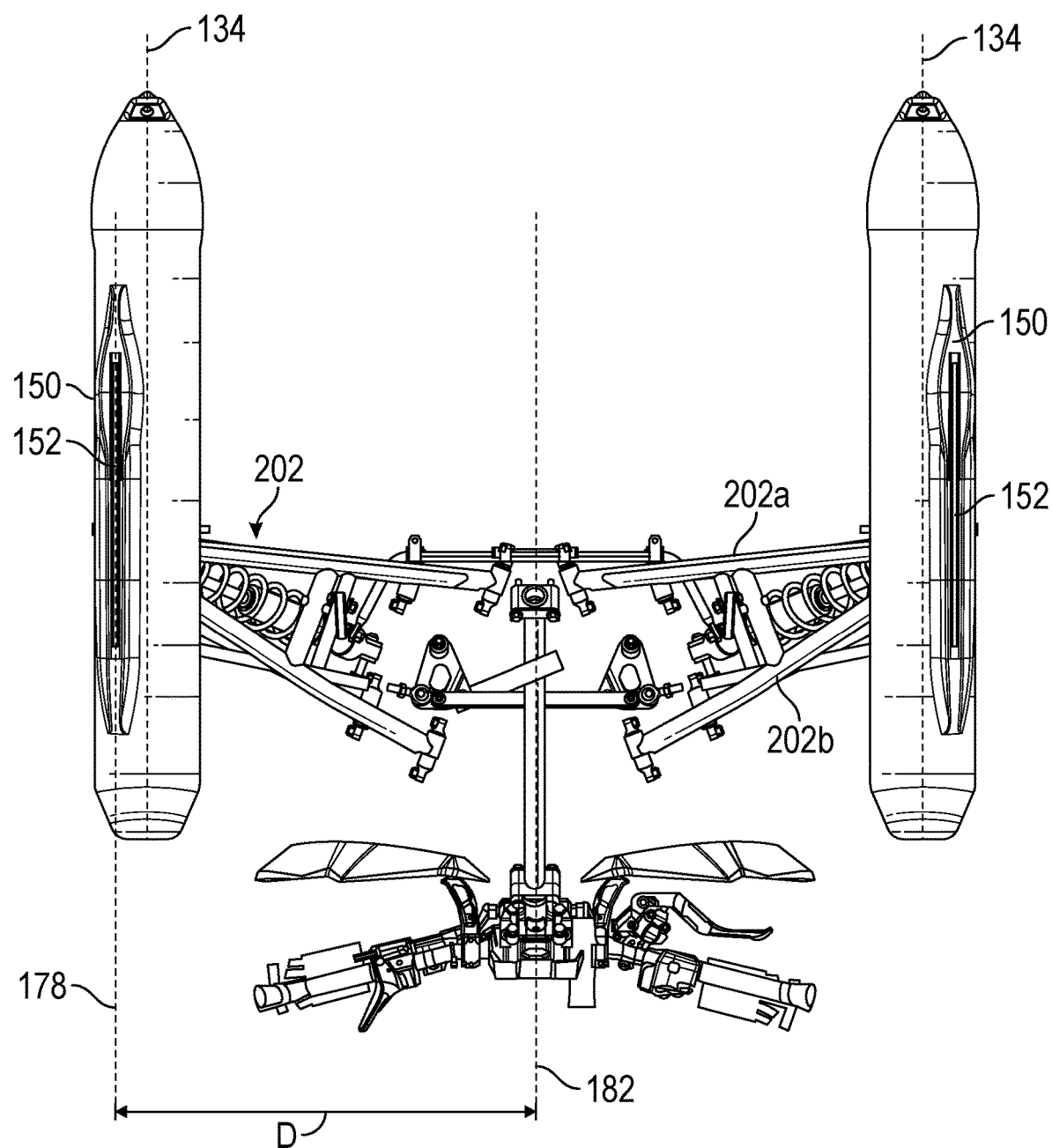
FIG. 9 is a bottom view of the ski assembly including a keel and a runner, the front suspension, and the steering assembly of FIG. 2.
Figure 10:
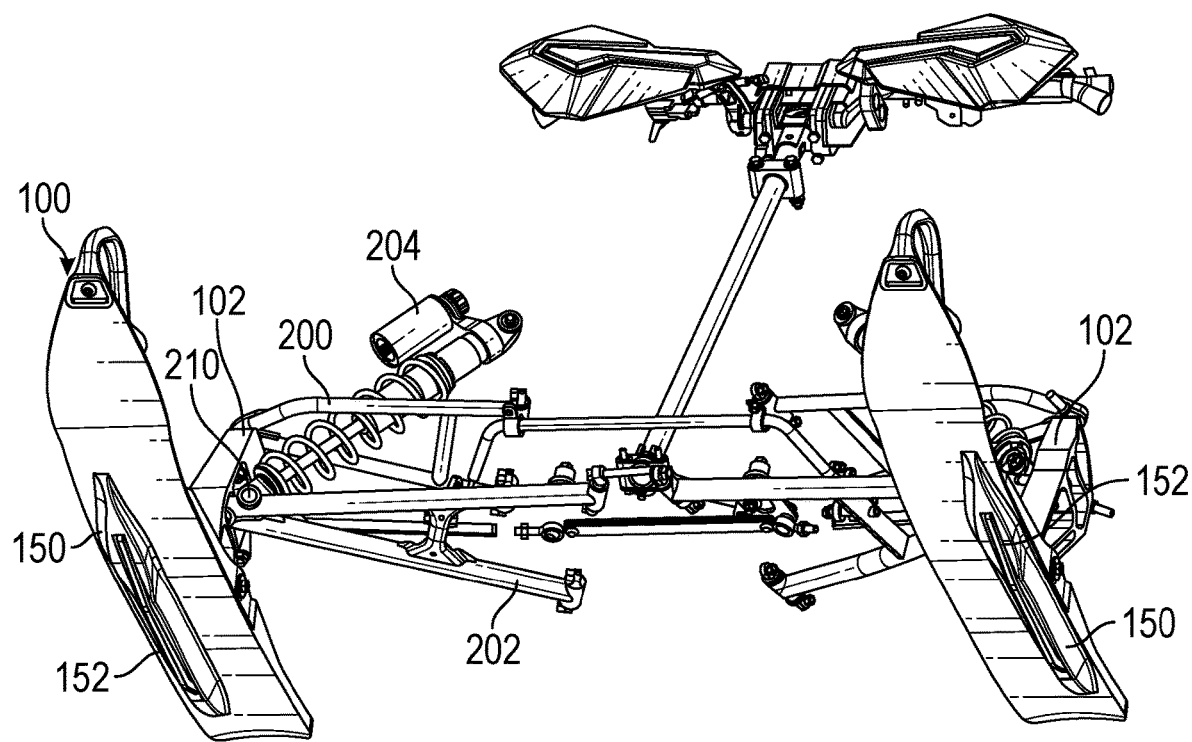
FIG. 10 is a bottom perspective view of the ski assembly including a keel and a runner, the front suspension, and the steering assembly of FIG. 2.

The front suspension assembly 22 is operably coupled to the front frame portion 14 and to the ski assembly 18. The front suspension assembly 22 is positioned longitudinally forward of the rear suspension assembly 24 and includes an upper control arm 200, a lower control arm 202, a linear force element, such as a shock absorber 204, and a torsion bar 206. As shown in FIG. 8, the upper control arm 200 includes a forward member 200a and a rearward member 200b, and, as shown in FIG. 9, the lower control arm 202 includes a forward member 202a and a rearward member 202b.

As illustrated in FIGS. 1 and 2, the upper end of shock absorber 204 is coupled to the front frame portion 14 (e.g., the bulkhead) and the lower end of shock absorber 204 is coupled to lower control arm 202. In one embodiment, the lower end of shock absorber 204 is directly coupled to a portion of lower control arm 202 with a coupler 208 (e.g., a bolt).

Figure 3:
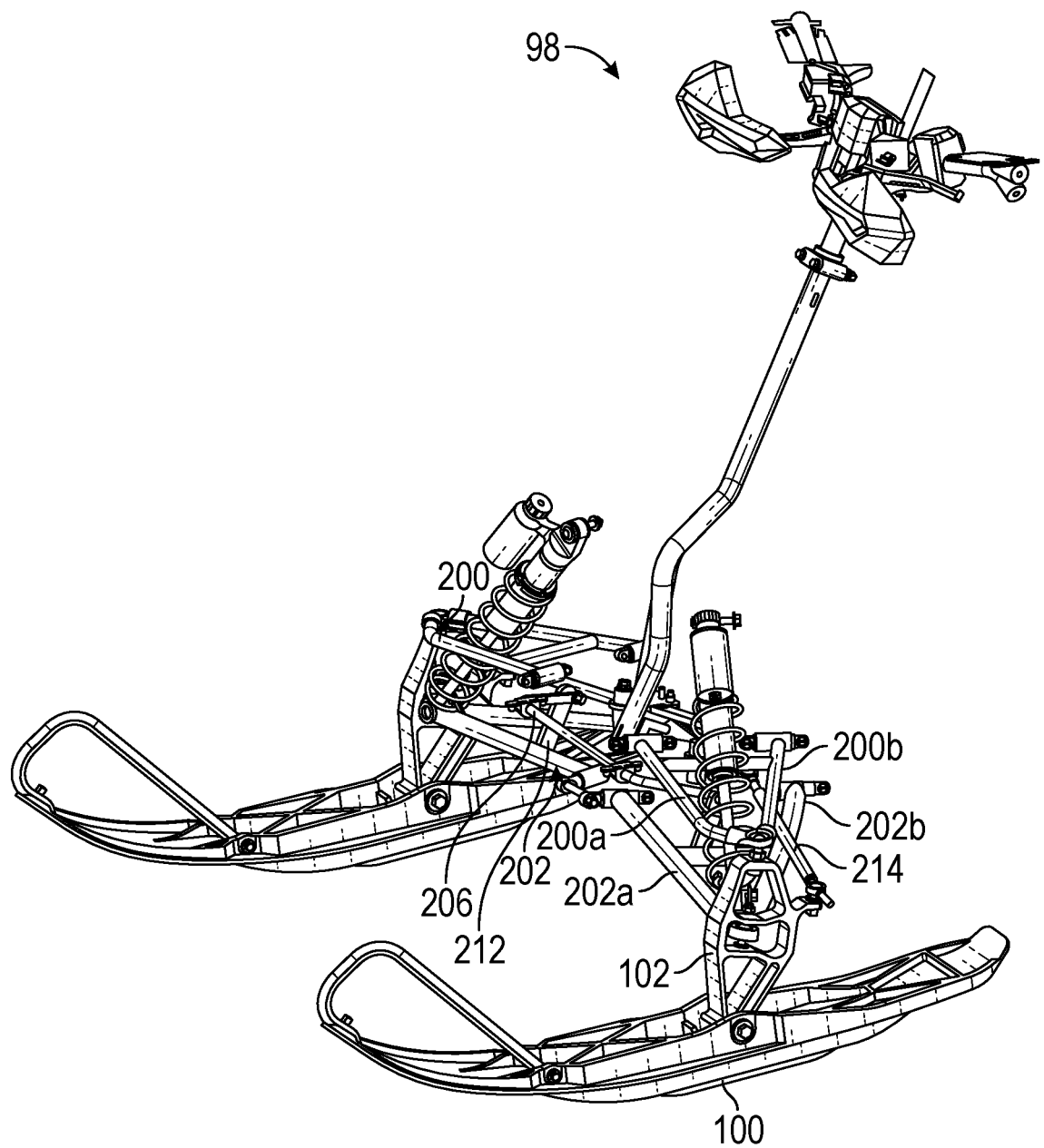
FIG. 3 is a perspective view of the ski assemblies, the front suspension, and the steering assembly of FIG. 2.
Figure 4:
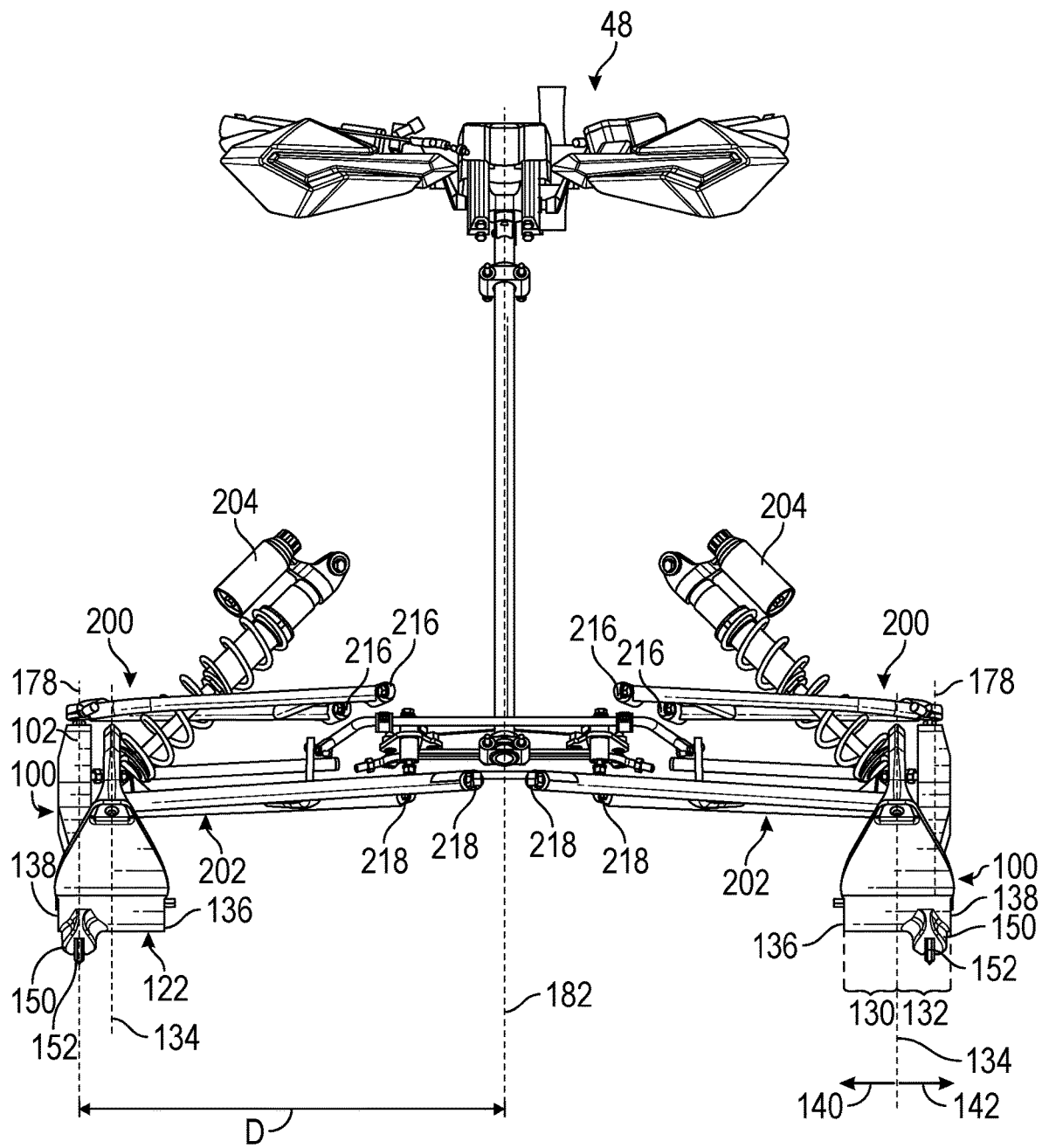
FIG. 4 is a front view of the ski assemblies, the front suspension, and the steering assembly of FIG. 2.
Figure 5:
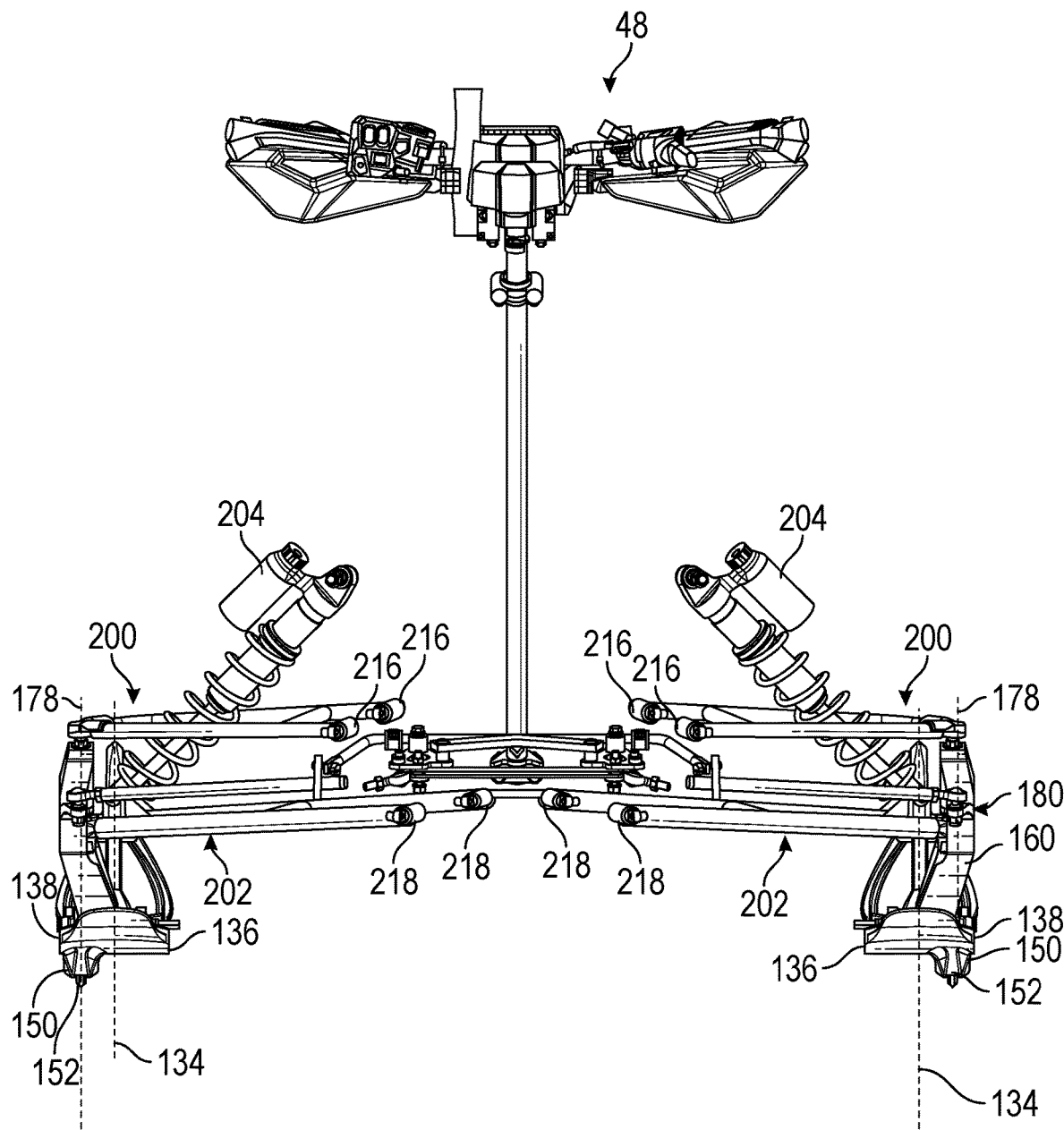
FIG. 5 is a rear view of the ski assemblies, the front suspension, and the steering assembly of FIG. 2.

Referring to FIGS. 1-3, the torsion bar 206 is operably coupled to the lower control arm 202 through a link member 212. In one embodiment, the torsion bar 206 is a one-piece member that does not include any weldments or bonded portions. The upper and lower control arms 200, 202, as well as a steering arm 214, are operably coupled to the spindle 102. More particularly, laterally outer ends of upper and lower control arms 200, 202 are operably coupled to spindle 102. Illustratively, conventional couplers, such as ball joints, couple the outer ends of upper and lower control arms 200, 202 to spindle 102. As shown in FIGS. 4 and 5, the inner ends of the upper and lower control arms 200, 202 include bushing assemblies 216, 218, respectively, for coupling with the front frame portion 14.

Referring to FIGS. 4-7, the ski 100 includes a top surface 120 and a bottom surface 122. The top surface 120 includes a coupling portion (e.g., a bracket 106, either integral with or removably coupled to the ski 100) (FIG. 11) to which the spindle 102 is coupled. The bottom surface 122 is operable to contact the ground when the snowmobile 10 is being operated.

Referring more specifically to FIGS. 4 and 5, the ski 100 may be subdivided into an inboard lateral side 130 and an outboard lateral side 132, the inboard and outboard lateral sides 130, 132 being defined by a central plane 134 that transects the ski 100 in a longitudinal direction and extends vertically. The central plane 134 is positioned at a lateral midpoint of the ski 100. In those embodiments in which the skis 100 are not equally distributed or symmetrical, have a curved longitudinal axis, or are otherwise difficult to define a lateral midpoint, the central plane 134 generally follows the longitudinal axis and is defined at a midpoint between lateral edges along the longitudinal length, or is defined at a lateral midpoint of the ski 100 along the longitudinal length with respect to a bottom surface 122 of the ski 100. Thus, in some embodiments, the central plane 134 may not be perfectly planar at various longitudinal positions of the ski as the central plane 134 is dictated by the geometry of the ski 100. For ease of reference and illustration, the central plane 134 is illustrated as planar along the longitudinal length by defining the central plane as extending vertically and longitudinally from a lateral midpoint of the ski at a longitudinal position relating to the longitudinal position at which the spindle 102 is coupled to the ski 100. Thus, the central plane 134 extends longitudinally and vertically from the coupling position between the spindle 102 and the ski 100. In some embodiments in which the ski is curved in the longitudinal direction, the central plane 134 may be a plane curve that is defined at the lateral center of the ski 100 along the longitudinal length of the ski 100 and extending vertically. In this embodiment, the central plane 134 follows the curvature of the ski 100. The central plane 134 therefore defines the inboard and outboard lateral sides 130, 132 of the ski and defines inboard and outboard lateral zones 140, 142 defined on each side of the central plane 134 and corresponding to the inboard and outboard lateral sides 130, 132, respectively. The ski 100 further includes an inboard lateral edge 136 and an outboard lateral edge 138. The inboard and outboard lateral edges 136, 138 each define the lateral extent of the ski 100 on the inboard and outboard lateral sides 130, 132, respectively.

Figure 6:
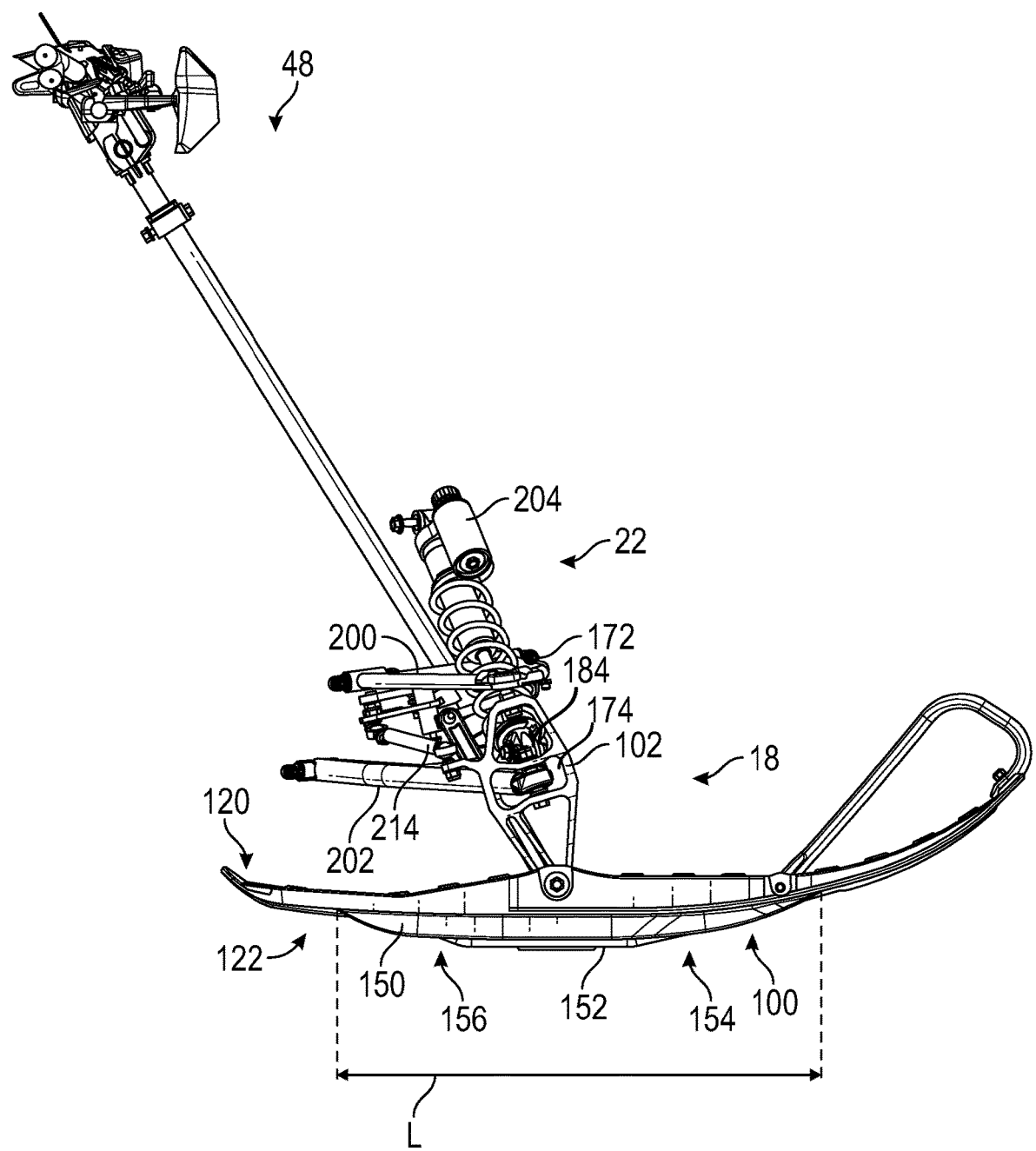
FIG. 6 is a right-side view of a right-side ski assembly including a spindle operably coupled to the front suspension and the steering assembly of FIG. 2.
Figure 7:
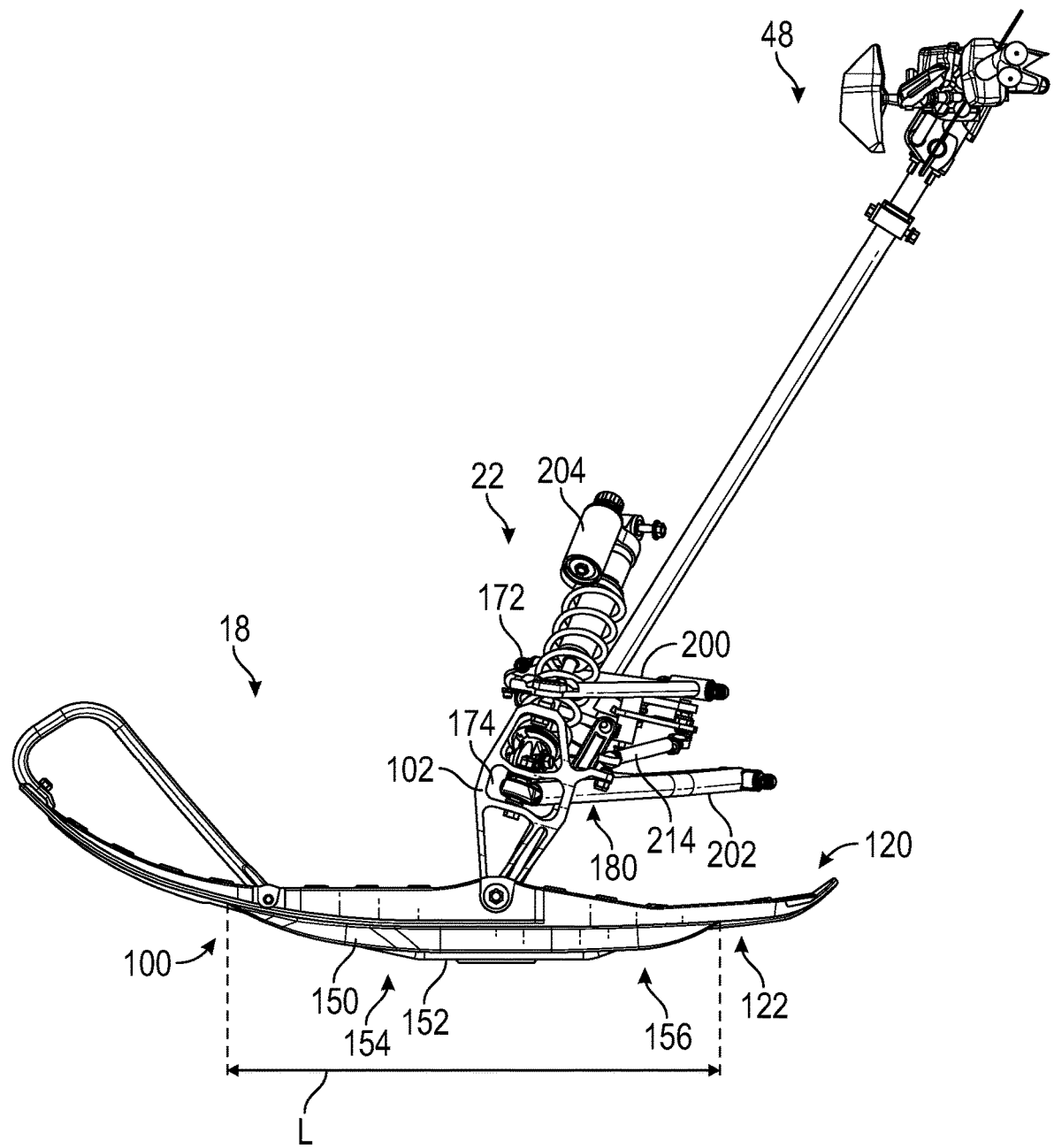
FIG. 7 is a left-side view of a left-side ski assembly including a spindle operably coupled to the front suspension and the steering assembly of FIG. 2.

The ski 100 includes a keel 150 extending from the bottom surface 122 of the ski 100. In one embodiment such as is illustrated in FIG. 4, the bottom surface 122 is a substantially flat surface such that the skis 100 are operable to support the snowmobile 10 on the ground (e.g., on snow which is compacted under pressure), and the keel 150 extends from the bottom surface 122 of the ski 100 to provide turning to the snowmobile 10. The keel 150 may include a runner 152 (e.g., defined as or including a carbide cutting element) extending therefrom. The runner 152 is supported by the keel 150. The keel 150 includes a front end 154 and a rear end 156 (FIGS. 6 and 7). The keel 150 extends longitudinally along the bottom surface 122 of the ski 100 a length L which extends between the front and rear ends 154, 156.

As illustrated in FIG. 4, the keel 150 is positioned on the outboard lateral side 132 of the ski 100 such that the keel 150 does not intersect or cross the central plane 134. In other embodiments, the majority of the keel 150 is positioned extending downward from the bottom surface 122 of the ski 100 on the outboard lateral side 132 of the ski 100 such that the keel 150 is positioned in the outboard lateral zone 142. In each of these embodiments, the keel 150 is thus not centered on the ski 100, but is instead positioned closer to or at the outboard lateral edge 138 relative to the inboard lateral edge 136.

Figure 12:
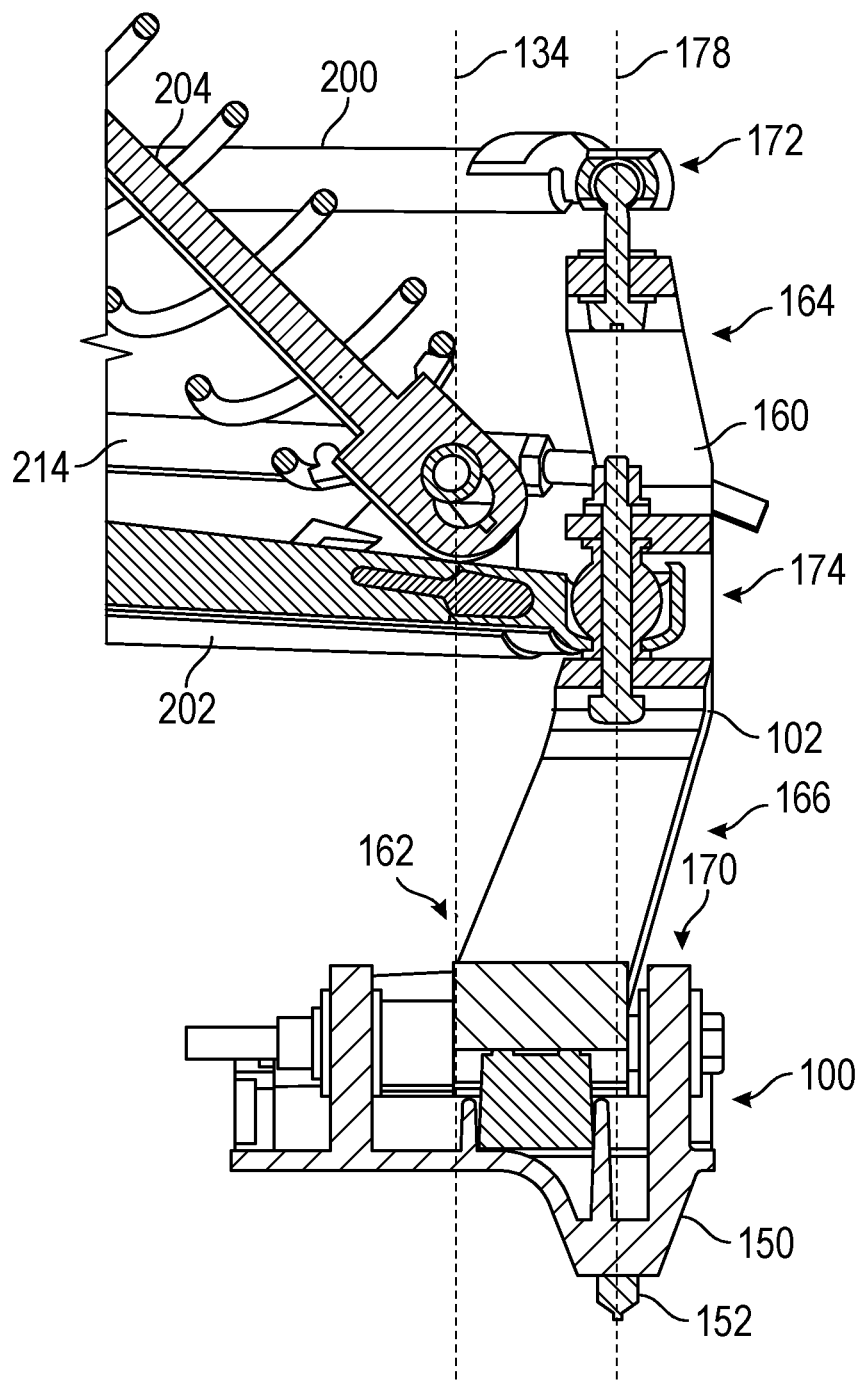
FIG. 12 is a lateral cross-sectional view of the left-side ski assembly of FIG. 7.

Referring to FIGS. 8 and 12, a lower end 166 of the spindle 102 is operably coupled to the ski 100. The ski 100 is able to pivot and move relative to and with the spindle 102 in order to slide over various terrain during operation of the snowmobile 10. More particularly, the spindle 102 is pivotably coupled to ski 100 with a fastener 104, illustratively a bolt, which defines a pivot axis for the ski 100. Other fasteners or couplers, such as washers and a nut, also may be coupled to the fastener 104 to secure the spindle 102 to the ski 100. Additionally, the bracket 106 may be coupled to the ski 100 and spindle 102 to facilitate pivoting of the ski 100 relative to spindle 102.

Referring to FIG. 12, the spindle 102 includes a spindle body 160 that is generally vertically disposed when coupled to the ski 100. The body 160 defines an upper end 164 and a lower end 166. The body includes a first coupling portion 162 at which the ski 100 is coupled to the spindle 102 at the lower end 166 of the spindle 102. The first coupling portion 162 is provided in any suitable configuration to couple the spindle 102 to the ski 100, including as described hereafter. The body 160 may include a generally curved or bent profile (see FIGS. 5 and 12). More specifically, the lower end 166 of the spindle 102 may be disposed closer to the central plane 134 than the upper end 164 when the spindle 102 is coupled to the ski 100. The curved or bent profile of the spindle 102 may be accomplished by including a curve or a bend in the spindle, such that the profile of the spindle is not linear. For example, the spindle 102 may include a substantially vertical portion and an angled portion, the vertical portion corresponding with an intermediate portion between the upper end 164 and the lower end 166 and the angled portion corresponding with the lower end 166. In some embodiments, the upper end 164 likewise corresponds with another angled portion of the spindle 102. The spindle 102 couples to the ski 100 at the lower end 166 of the spindle 102 at a first coupling position 170. The first coupling position 170 of the spindle 102 to the ski 100 is positioned laterally closer to the outboard lateral edge 138 than it is to the inboard lateral edge 136. For example, in some embodiments, the first coupling position 170 is positioned in the outboard lateral zone 142, meaning it is outboard relative to the central plane 134.

Figure 11:
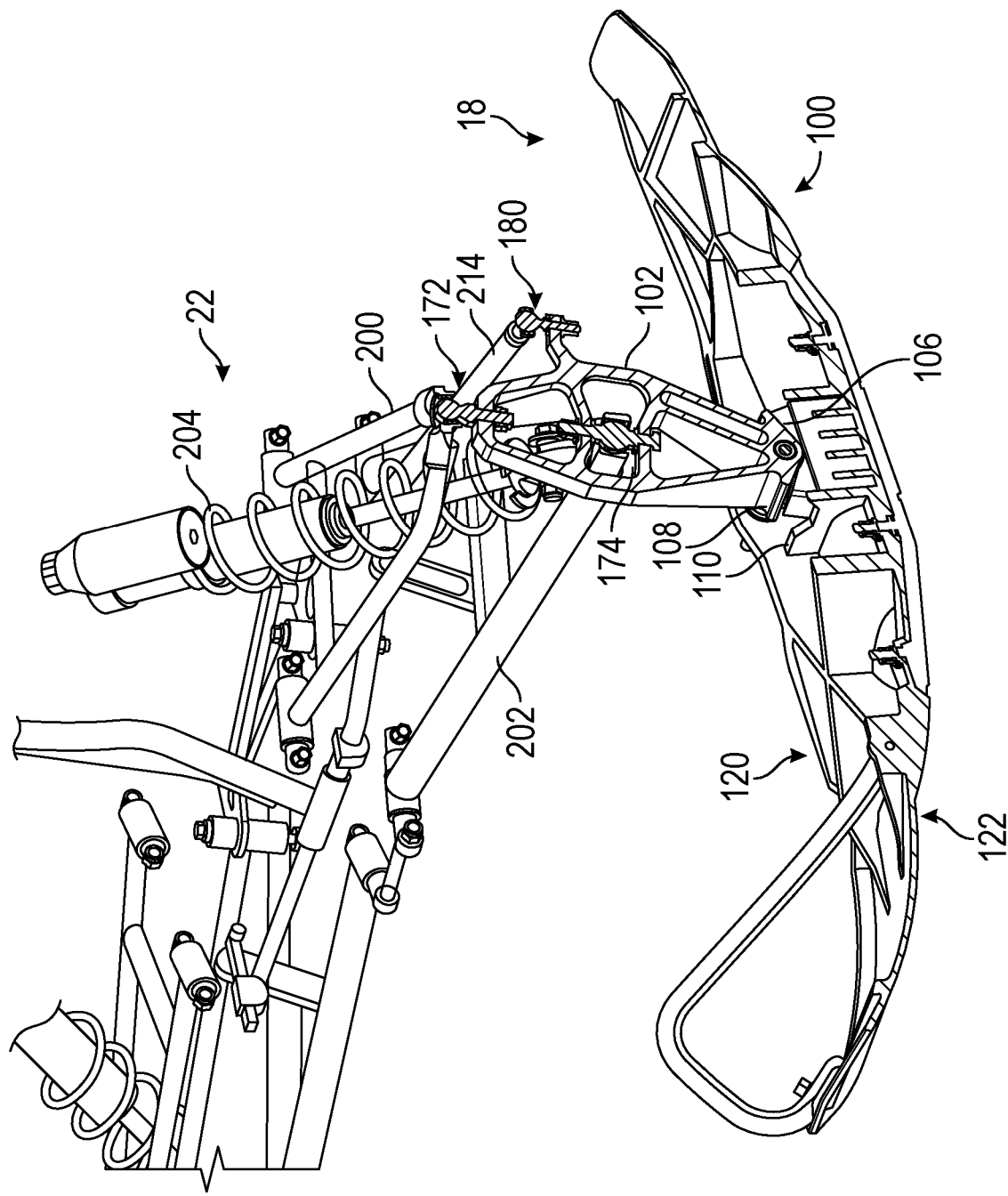
FIG. 11 is a longitudinal cross-sectional view of the left-side ski assembly of FIG. 7.

In some embodiments, the first coupling position 170 may include the bracket 106 that is mounted to or integral with the ski 100. The interface between the spindle 102 and the ski 100 is positioned on the outboard lateral side 132 of the ski 100. For example, the spindle 102, when coupled to the ski 100, is positioned on the outboard lateral side 132 of the ski 100 such that the spindle 102 does not intersect or cross the central plane 134. In other embodiments, the majority of the spindle 102 interfaces with the ski 100 at a position on the outboard lateral side 132 of the ski 100 such that the spindle 102 is positioned in the outboard lateral zone 142. In each of these embodiments, the spindle 102 and, more specifically, the position at which the spindle 102 interfaces with the ski 100 is not centered on the ski 100, but is instead positioned closer to the outboard lateral edge 138 than to the inboard lateral edge 136. FIG. 11 illustrates a section view of the ski 100 and spindle 102 with the spindle 102 coupled to the ski 100. The cross section of the ski 100 and spindle 102 of FIG. 11 is taken at a position that is not aligned with the central plane 134 in order to show the coupling of the spindle 102 to the ski 100.

Even though the ski 100 is configured to pivot relative to the spindle 102, the ski 100 may not be configured to pivot 90° relative to the ground. As such, the ski 100 is not configured to "stand up" or be vertically positioned relative to the ground. In this way, the tip of the ski 100 will not become vertically lodged or stuck in the snow. In order to reduce the likelihood that the ski 100 will become vertically stuck in the snow, the lower end of spindle 102 may include a flange 108 which is configured to contact a rib 110 of the ski 100 if the ski 100 pivots in the vertical direction by a specific amount. In this way, the rib 110 acts as a travel limiter or stop for ski 100 to prevent motion beyond a certain angle relative to the ground. As such, the flange 108 of the spindle 102 and the rib 110 of the ski 100 limit rotation of the ski 100 relative to the spindle 102 within a certain rotation angle, thereby reducing the likelihood that the ski 100 will become vertically stuck in the snow (see FIG. 11).

Regarding FIGS. 3-7 and 11-12, the spindle 102 is operably coupled to the suspension assembly 22 and the steering assembly 48. The spindle 102 includes a second coupling position 172 and a third coupling position 174 at which the spindle 102 is coupled to the suspension assembly 22 (i.e., suspension coupling positions). For example, the spindle 102 is operably coupled to the upper control arm 200 at the second coupling position 172 and to the lower control arm 202 at the third coupling position 174. The spindle 102 and the suspension assembly 22 may be coupled in a variety of manners, including but limited to, ball joints, socket joints, and so forth. The spindle 102 is configured to steer skis 100 by rotation relative to a king pin axis 178, which is defined as the axis extending between second and third coupling positions 172, 174 (e.g., the axis extending through the connection of the upper control arm 200 with the spindle 102 and the connection of the lower control arm 202 with the spindle 102). The king pin axis 178 is substantially vertical from a front or rear view and, therefore, substantially parallel to the central plane 134. For example, when the central plane 134 is defined extending upward and longitudinally at a lateral midpoint of the ski at a longitudinal position where the ski 100 interfaces with the spindle 102, the king pin axis 178 extends parallel to the central plane 134. As illustrated in FIG. 12, the king pin axis 178 may also extend through at least a portion of the interface between the ski 100 and the spindle 102 (e.g., the first coupling position 170) and through the keel 150 and the runner 152. For example, the keel 150 and the runner 152 may be substantially centered laterally on the king pin axis 178. The positioning of the interface between the ski 100 and the spindle 102 is positioned along the king pin axis 178. In some embodiments, the positioning of the interface between the ski 100 and the spindle 102 is at least partially offset from the king pin axis 178 such that the spindle 102 is cantilevered.

In those embodiments in which the spindle 102 includes a curved profile, the second and third coupling positions 172, 174 may be generally vertically aligned. The second and third coupling positions are positioned laterally closer to the outboard lateral edge 138 than it is to the inboard lateral edge 136 of the ski 100. For example, in some embodiments, the first coupling position 17 is positioned in the outboard lateral zone 142, meaning outboard relative to the central plane 134. In some embodiments, the entire spindle body 160 is positioned laterally outboard from the central plane 134 of the ski 100. In other embodiments, the majority of the spindle body 160 is positioned outboard relative to the central plane 134 such that a midpoint of each of the first, second, and third coupling positions 170, 172, 174 are each positioned outboard of the central plane 134.

The spindle 102 also defines a fourth coupling position 180 at which the steering assembly 48 is coupled to the spindle 102. For example, the steering assembly 48 includes the steering arm 214 which couples to the spindle 102. A vertical axis extending through the fourth coupling position 180 and about which the spindle rotates relative to the steering arm 214 may be generally parallel to king pin axis 178 and, in some embodiments, may be colinear with king pin axis 178. It may be apparent from at least FIG. 8 of the present disclosure that both the king pin axis 178 and the vertical axis extending through the fourth coupling position are outboard of the central plane 134. In this way, the king pin axis 178, the vertical axis through the fourth coupling position 180 (e.g., the connection between the steering arm 214 and the spindle 102), and the keel 150 are all outboard of the central plane 134, thereby maximizing the width the front suspension assembly 22 and the steering assembly 48 for improved cornering of the snowmobile 10. The second and third coupling positions 172, 174 may be substantially positioned within the lateral profile of the spindle 102. In other embodiments, the second and third coupling positions 172, 174 are positioned laterally spaced from the spindle body 160. For example, the spindle may include protrusions, linkages, or arms (not shown) extending away from the spindle body 160 which are operably coupled to the steering assembly 48 and suspension assembly 22.

The spindle 102 also defines a fifth coupling position 184 at which the shock absorber 204 is coupled to the spindle 102. Because the spindle 102 is positioned in the outboard lateral zone 142 of the ski 100, the fifth coupling position 184 is also positioned in the outboard lateral zone 142. In some embodiments, the fifth coupling position 184 is generally vertically aligned along the king pin axis 178. In some embodiments, the fifth coupling position 184 is not aligned with the king pin axis 178 but is still positioned in the outboard lateral zone 142 of the ski 100. In some embodiments, for example, the spindle 102 is operably coupled to the ski 100 at a first position on the outboard lateral side, the spindle 102 including a second coupling position and a third coupling position at which the spindle 102 is operably coupled to the suspension assembly 22, the fourth coupling position 180 at which the spindle 102 is operably coupled to the steering arm 214, and a fifth coupling position 184 at which the spindle 102 is operably coupled to the shock absorber 204, the first, second, third, fourth, and fifth coupling positions all being positioned outboard relative to the central plane 134 of the ski 100 when the spindle 102 is operably coupled to the ski 100.

Referring now to FIGS. 4 and 9, the keel 150 and runner 152 are laterally offset on the ski 100 toward an outboard side of the ski 100 (e.g., in the outboard lateral zone 142 or adjacent or proximate the outboard lateral edge 138 of the ski 100). For example, the keel 150 may extend from the ski 100 on the outboard half of the ski 100, on the outermost third of the ski 100, or the outermost fourth of the ski 100. In other words, the keel 150 may extend downwardly from the ski 100 at any position within the outboard lateral zone 142. This allows the distance D from a longitudinally-extending centerline 182 of the snowmobile 10 to the lateral center of the keel 150 and runner 152 (e.g., in one embodiment, the position defined by the king pin axis 178) to be greater than when the ski 100 includes a keel and runner positioned in the lateral center of the ski 100. In some embodiments, the lateral center of the keel 150 and runner 152 are positioned at least 21.25 inches from the longitudinally-extending centerline 182 of the snowmobile 10. For example, the lateral center of the keel 150 and runner 152 may be positioned at about 21.25 inches, 21.5 inches. 21.75 inches, 22 inches, 22.25 inches, 22.5 inches, 22.75 inches, or 23 inches from the longitudinally-extending centerline 182 of the snowmobile 10. This increases the stability of the snowmobile, including when the snowmobile 10 is cornering. Furthermore, the wider placement of the keel 150 and the runner 152 does not expand the overall width of the snowmobile 10 or skis 100, which in some localities is limited to certain widths by regulation. The placement of the keel 150 and the runner 152 in the outboard lateral zone 142 of the ski 100 also reduces the likelihood of the keel 150 and runner 152 conforming to the profile of frozen snow tracks from other snowmobiles and thereby limiting the ability to steer as the grooves of other snowmobiles freeze and limit the steering capacity when both keels 150 and runners 152 are positioned in grooves formed by other snowmobiles. By placing the keel 150 and runner 152 further from the longitudinally-extending centerline 182 of the snowmobile 10, it is less likely for both keels 150 and runners 152 to be positioned in the groove formed by other snowmobiles. Stability is further increased by placing the keel 150 and runner 152 along the king pin axis 178.

Additionally, traction and steerability of the snowmobile 10 is increased when the keel 150 and runner 152 are positioned adjacent or proximate the outboard lateral edge 138 of the ski 100 by reducing buildup of snow on the ski 100. For example, because the keel 150 is positioned adjacent the outboard lateral edge 138 of the ski 100, there is minimal or no bottom surface of the ski 100 on which snow can buildup outboard of the keel 150. Stated otherwise, snow has a clear exit path on the outboard side of the keel 150 during use such that the snow is expelled upward and outboard from the keel 150. Because there is decreased snow buildup on the ski 100 the keel 150 and runner 152 are able to engage the ground snow better and retain increased control and stability of the vehicle, including during cornering events.

In view of the foregoing, it may be apparent that as the width of snowmobile 10 increases, the stability in corners (e.g., the performance and speed at which the rider can navigate corners) increases. The keels of snowmobiles facilitate steering, maneuverability, and cornering of snowmobiles. Because, in some localities, the width of the snowmobile 10 is defined as the lateral distance between the outer surface of the left ski to the outer surface of the right ski, rather than the width between the keels, the snowmobile 10 of the present disclosure maintains the overall width of the snowmobile 10 while lengthening the control arms 200, 202 and steering arms 214 to a position vertically aligned with the outboard location of keels 150. In this way, the width of the king pin axis 178 and the keel 150 (which, illustratively, may be vertically aligned with each other), relative to centerline 182, is increased, thereby increasing the cornering and stability of the snowmobile 10. Minimal deviations of exact alignment (including, but not limited to, less than 1 cm, less than 2 cm, and less than 3 cm in either direction) are understood to be covered by descriptions of the embodiments implementing the term "aligned" for the purposes of the disclosure and therefore are not limited by exact alignment.

It is understood that the disclosed embodiments may be implemented as a retrofittable kit or assembly for snowmobile 10 and may be configured to be installed on an existing snowmobile 10 or the disclosed embodiments may be implemented during production of the snowmobile 10 by the original equipment manufacturer ("OEM").

The above detailed description of the present disclosure and the examples described therein have been presented for the purposes of illustration and description only and not by limitation. It is therefore contemplated that the present disclosure covers any and all modifications, variations or equivalents that fall within the scope of the basic underlying principles disclosed above and claimed herein. Moreover, the inventive concepts hereby addressed have been described above both generically and with regard to specific examples. It will be apparent to those skilled in the art that various modifications and variations can be made in the examples without departing from the scope of the disclosure. Likewise, the various components discussed in the examples are combinable. Thus, it is intended that the examples be viewed collectively, as a whole, as also intimating various modifications and variations of those specific examples.

The invention claimed is:

1. A snow vehicle, comprising:
 a frame including a tunnel and a front portion;
 an endless track at least partially positioned within the tunnel;
 a ski supporting the front portion of the frame, the ski defining a central plane extending vertically and longitudinally, the central plane defining an inboard lateral side and an outboard lateral side, the ski having a bottom surface and a keel extending therefrom on the outboard lateral side;
 a spindle coupled to the ski at a first position on the outboard lateral side; and
 a front suspension coupled to the spindle at a second position outboard from the central plane of the ski and a third position located outboard from the central plane of the ski.

2. The snow vehicle of claim 1, wherein an axis extending through the second position and the third position is defined as the king pin axis, and the king pin axis is substantially vertically aligned with the keel.

3. The snow vehicle of claim 2, wherein the ski includes a runner substantially vertically aligned with the king pin axis.

4. The snow vehicle of claim 2, wherein the king pin axis is parallel to the central plane of the ski.

5. The snow vehicle of claim 2, wherein the first position at which the spindle is coupled to the ski is positioned substantially along the king pin axis.

6. The snow vehicle of claim 1, wherein the first position and the second position at which the front suspension is coupled to the spindle is at least 22 inches from a longitudinally-extending centerline of the vehicle.

7. The snow vehicle of claim 1, wherein a longitudinally-extending centerline of the keel is positioned at least 22 inches from a longitudinally-extending centerline of the vehicle.

8. The snow vehicle of claim 1, further comprising a steering assembly operably coupled to the spindle at a fourth coupling position vertically above the ski and laterally outboard from the central plane of the ski.

9. The snow vehicle of claim 1, wherein the keel is positioned on an outboard edge of the ski such that an outermost edge of the keel is proximate the outboard edge of the ski.

10. The snow vehicle of claim 1, wherein the spindle is cantilevered.

11. A snow vehicle, comprising:
 a frame including a tunnel and a front portion;
 an endless track at least partially positioned within the tunnel;
 a ski supporting a front portion of the frame, the ski defining a central plane extending vertically and longitudinally, the central plane defining an inboard lateral side and an outboard lateral side;
 a spindle coupled to the ski at a first position on the outboard lateral side; and
 a front suspension including a first control arm and a second control arm, the first and second control arms extending from the inboard lateral side, across the central plane, and to the outboard lateral side, and the first and second control arms being coupled to the spindle at positions vertically above the ski and laterally outboard from the central plane of the ski.

12. The snow vehicle of claim 11, wherein the first and second control arms are coupled to the spindle at least 22 inches from a longitudinally-extending centerline of the vehicle.

13. The snow vehicle of claim 11, wherein the ski includes a keel and a runner positioned on the outboard lateral side of the ski.

14. The snow vehicle of claim 13, wherein the keel extends downwardly from a bottom surface of the ski proximate an outboard edge of the ski.

15. The snow vehicle of claim 13, wherein the keel extends from the ski at a position that is linearly aligned with the positions at which the first and second control arms are coupled to the spindle.

16. The snow vehicle of claim 11, further comprising a steering assembly operably coupled to the spindle at a fourth coupling position vertically above the ski and laterally outboard from the central plane of the ski.

17. The snow vehicle of claim 16, wherein a vertical axis extending through the fourth coupling position is generally parallel to the king pin axis.

18. A ski assembly for a snow vehicle, comprising:
- a ski operable to support a front portion of a frame, the ski defining a central plane extending vertically, the central plane defining an inboard lateral side and an outboard lateral side, the ski having a bottom surface and a keel extending therefrom on the outboard lateral side; and
- a spindle operable to be coupled to the ski at a first position on the outboard lateral side, the spindle including a first suspension mounting position and a second suspension mounting position, the first and second suspension mounting positions being positioned outboard relative to the central plane of the ski when coupled to the ski.

19. The ski assembly of claim 18, wherein a king pin axis extending through the first and second positions is generally parallel to the central plane.

20. A ski assembly, comprising:
- a ski operable to support a front portion of a frame, the ski defining a central plane extending vertically, the central plane defining an inboard lateral side and an outboard lateral side at lateral midpoints of the ski along a longitudinal length of the ski, the ski having a bottom surface and a keel extending therefrom on the outboard lateral side; and
- a spindle operable to be coupled to the ski at a first position on the outboard lateral side, the spindle including a second coupling position and a third coupling position at which the spindle is operable to be coupled to a suspension assembly, a fourth coupling position at which the spindle is operable to be coupled to a steering arm, and a fifth coupling position at which the spindle is operable to be coupled to a shock absorber, the first, second, third, fourth, and fifth coupling positions all being positioned outboard relative to the central plane of the ski when the spindle is operably coupled to the ski.

* * * * *